United States Patent
Foell et al.

(10) Patent No.: US 7,139,720 B1
(45) Date of Patent: Nov. 21, 2006

(54) PROJECT PLANNING SYSTEM AND METHOD FOR ACCOMMODATING AD HOC REQUESTS WITHIN A FIXED CORE DEVELOPMENT CYCLE

(75) Inventors: Philip G. Foell, Cleveland Heights, OH (US); Teresa M. Light, Chagrin Falls, OH (US); David R. Podnar, Copley, OH (US); Peggy S. Koontz, Macedonia, OH (US)

(73) Assignee: Xerox Corporation, Stamford, CT (US)

( * ) Notice: Subject to any disclaimer, the term of this patent is extended or adjusted under 35 U.S.C. 154(b) by 718 days.

(21) Appl. No.: 09/712,438

(22) Filed: Nov. 14, 2000

(51) Int. Cl.
*G06Q 10/00* (2006.01)
(52) U.S. Cl. ............................................. 705/8
(58) Field of Classification Search ............... 705/7–11
See application file for complete search history.

(56) References Cited

U.S. PATENT DOCUMENTS

| | | | | |
|---|---|---|---|---|
| 4,937,743 A | * | 6/1990 | Rassman et al. | 705/8 |
| 5,321,610 A | * | 6/1994 | Breslin | 705/9 |
| 5,406,476 A | * | 4/1995 | Deziel et al. | 705/8 |
| 5,408,663 A | * | 4/1995 | Miller | 718/104 |
| 5,537,524 A | * | 7/1996 | Aprile | 345/440 |
| 5,548,506 A | * | 8/1996 | Srinivasan | 705/8 |
| 5,586,021 A | | 12/1996 | Fargher et al. | |
| 5,615,121 A | * | 3/1997 | Babayev et al. | 705/9 |
| 5,619,695 A | * | 4/1997 | Arbabi et al. | 718/100 |
| 5,671,361 A | * | 9/1997 | Brown et al. | 705/9 |
| 5,826,252 A | | 10/1998 | Wolters, Jr. et al. | |
| 5,875,431 A | | 2/1999 | Heckman et al. | |
| 5,913,201 A | * | 6/1999 | Kocur | 705/9 |
| 5,946,212 A | | 8/1999 | Bermon et al. | |
| 5,983,194 A | | 11/1999 | Hogge et al. | |
| 6,032,121 A | | 2/2000 | Dietrich et al. | |

(Continued)

FOREIGN PATENT DOCUMENTS

DE          10225178 A1 * 12/2003

OTHER PUBLICATIONS

Ash, Activity Scheduling in the Dynamic, Multi-Project Setting: Choosing Heuristics Through Deterministic Simulation, Proceedings of the 1999 Winter Simulation Conference, 1999, p. 937-941 [GOOGLE].*

(Continued)

*Primary Examiner*—Romain Jeanty
*Assistant Examiner*—Jonathan G Sterrett
(74) *Attorney, Agent, or Firm*—Fay, Sharpe, Fagan, Minnich & McKee, LLP

(57) ABSTRACT

A planning system for the planning and management of multiple projects includes an input (122) for entering project information and task information associated with each project. The project information identifies each project as being of a mandatory, nonmandatory, or ad hoc type that arises intermittently and is subject to change. The task information describes each task to be performed by users of the system and an estimated duration of each task. Also included are a work hour calculator (124), an allocation engine (128), a schedule preparation engine (130), a time tracking system (132), and a time imbalance calculator (134). An allocation modification engine (136) reestimates the time required for completing each project based on the actual time spent and current status for each project and reallocates time to eliminate any time imbalance detected by the time imbalance calculator.

16 Claims, 4 Drawing Sheets

U.S. PATENT DOCUMENTS

| | | | |
|---|---|---|---|
| 6,047,260 A | | 4/2000 | Levinson |
| 6,101,481 A | * | 8/2000 | Miller .......................... 705/9 |
| 6,119,095 A | | 9/2000 | Morita |
| 6,678,671 B1 | * | 1/2004 | Petrovic et al. ................ 707/1 |

OTHER PUBLICATIONS

Bowers et al., A Practical Application of a Multi-Project Scheduling Heuristic, Production and Inventory Management Journal, Fourth Quarter 1996, p. 19-25 [PROQUEST].*

McGrath, Michael, "Setting the PACE in Product Development: A Guide to Product and Cycle Time Excellence", 1996, Butterworth-Heinemann (Elsevier), Boston, pp. 1-184.*

McGrath, Michael, "Moving along the curve", Jan. 1999, Electronic Business, v24, n1, p10(1), Dialog 06068794 53537918.*

Anonymous, "Getting Wired for Innovation", Jul./Aug. 1999, Strategic Direction, v15n7, pp. 17-19, Dialog 02553794 273736571.*

Ong, Jennifer, "Rapid telecommunication service development", Nov. 1997, Telecommunications, Dedham, vol. 31, Iss. 11, p. 40, 3 pgs., ProQuest ID 23172162.*

Business Wire, "Too many projects in the development pipeline hurt successful launch rate for medical devices/equipment companies", Feb. 19, 1998, p. 1, ProQuest ID 26492063.*

Page, Albert; "Chicago Chapter News: Front-Line Product Development—Pipeline Management", Apr. 1996, PDMA Visions Magazine, pp. 1-2, www.pdma.org/visions/apr96/chicago.html.*

NN8907480, Resource Allocation and resource compression for project management systems, Jul. 1, 1989, IBM Technical Disclosure Bulletin, vol. 32, Iss. 2, pp. 480-487.*

* cited by examiner

PROJECT PLANNING SYSTEM AND METHOD FOR ACCOMMODATING AD HOC REQUESTS WITHIN A FIXED CORE DEVELOPMENT CYCLE

FIELD OF THE PRESENT INVENTION

The present invention relates generally to a project planning and management system and, more particularly, to a tool for the simultaneous production of one or more core products and specialized or custom work or other projects based on customer demands that arise on an ad hoc basis. In a preferred aspect, the present invention provides a system and method for project planning and management in a software development environment that balances fixed and variable content requests in a controlled manner.

BACKGROUND OF THE PRESENT INVENTION

Often, a production environment will involve both fixed (core) production content and variable (custom) production content. Since customized production is usually based on customer requests that arise on an irregular basis, it is difficult to forecast for purposes of resource allocation. In conventional practice, resources are typically allocated to either fixed content or variable content. This methodology, however, suffers from the drawback of under-utilized resources and slack time during periods when custom project requests fall off, and over-utilized resources and/or the loss of profitable custom work during periods when the number of custom project requests is high. Thus, it would be desirable to provide a project planning and management system or technique that accommodates both core and variable production content.

SUMMARY OF THE PRESENT INVENTION

A first aspect of the present invention is a method for managing the planning and performance of multiple projects, the multiple projects comprising one or more projects that are identified as a mandatory type, one or more projects that are identified as nonmandatory type, and one or more projects of an ad hoc type that arise intermittently and are subject to change. The method includes calculating a number of working hours available for performance of the multiple projects; estimating the time required for completion of each project; based on the time estimates, allocating a first amount of time for performance of the mandatory projects, allocating a second amount of time for performance of the ad hoc projects, and allocating a third amount of time to be held in reserve, wherein the sum of the first, second, and third amounts of time is less than or equal to the available hours; assigning tasks associated with the projects for performance; periodically inputting an actual time spent in performing the projects and a current status of each project; based on the actual time spent and current status for each project, reestimating the time required for completing each project; for each project type, determining if there exists a time imbalance between the allocated time for completion and the reestimated time for completion; and if there exists a time imbalance, reallocating the first, second, and third amounts of time to eliminate the time imbalance.

A second aspect of the present invention is an information handling system comprising a processing system and a project planning and management system interconnected with the processing system, the project planning and management system for managing the planning and performance of multiple projects, the multiple projects comprising one or more projects that are identified as a mandatory type, one or more projects that are identified as nonmandatory type, and one or more projects of an ad hoc type that arise intermittently and are subject to change. The project planning and management system is configured to: calculate a number of working hours available for performance of the multiple projects; estimate the time required for completion of each project; based on the time estimates, allocate a first amount of time for performance of the mandatory projects, a second amount of time for performance of the ad hoc projects, and a third amount of time to be held in reserve, wherein the sum of the first, second, and third amounts of time is less than or equal to the available hours; record assignments of tasks associated with the projects for performance; periodically receive input of an actual time spent in performing the projects and a current status of each project; reestimate, based on the actual time spent and current status for each project, the time required for completing each project; determine, for each project type, if there exists a time imbalance between the allocated time for completion and the reestimated time for completion; and if there exists a time imbalance, reallocating the first, second, and third amounts of time to eliminate the time imbalance.

A third aspect of the present invention is a planning system for the planning and management of multiple projects, the multiple projects comprising one or more projects that are identified as a mandatory type, one or more projects that are identified as nonmandatory type, and one or more projects of an ad hoc type that arise intermittently and are subject to change. The planning system comprises an input means for entering project information and task information associated with each project, the project information identifying each project as being of a mandatory, nonmandatory, or ad hoc type, and the task information describing each task to be performed by users of the system and an estimated duration of each task; a work hour calculator for calculating a number of working hours available for performance of the multiple projects; an allocation engine for allocating a first amount of time for performance of the mandatory projects, a second amount of time for performance of the ad hoc projects, and a third amount of time to be held in reserve, wherein the sum of the first, second, and third amounts of time is less than or equal to the available hours; a schedule preparation engine for preparing a schedule of tasks for performance, the schedule comprising an estimated time for the performance of each task; a time tracking system for recording actual time spent in performing the projects and a current status of each project; a time imbalance calculator for detecting a difference between actual time spent in performance of the projects and the estimated time for performance of the projects; and an allocation modification engine for reestimating the time required for completing each project based on the actual time spent and current status for each project and reallocating time to eliminate any time imbalance detected by the time imbalance calculator.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention, and together with the general description given above and the description of the preferred embodiments given below, serve to explain the principles of the invention.

BRIEF DESCRIPTION OF THE DRAWINGS

The following is a brief description of each drawing used to describe the present invention, and thus, are being presented for illustration purposes only and should not be limitative of the scope of the present invention, wherein.

DETAILED DESCRIPTION OF THE PRESENT INVENTION

The present invention provides a project planning and management system and method that accommodates multiple modes of product development and production. Generally, production is divided into fixed or planned production and variable production, although further divisions are also contemplated. Planned production content refers to production of products having a generally fixed time schedule, such as core product releases that are planned for release at a particular time. Planned production releases can also be scheduled for release on a regular basis, such as yearly, twice a year, quarterly, monthly, and so forth. Variable production content refers to specific or custom requests for products that tend to arise on an irregular or intermittent basis. Although the present invention will be described primarily by way of reference to the preferred embodiment of production within a software development environment, it will be recognized that the present invention is also applicable to other production environments having both fixed and variable content.

The present invention uses a concept of running two virtual factories simultaneously. The first factory handles the core product releases planned for release at a fixed time or at fixed time intervals. The second factory handles custom projects that tend to arise on an ad hoc basis. Thus, factory one and factory two each have different priorities, schedules, and planning processes. However, the factories use the same or similar production processes, thus allowing the factories to be virtual, i.e., the workers (e.g., software engineers) are a part of the same enterprise and can work back and forth on projects assigned to both factories, depending on assignments, schedules, and time allocations generated by the planning system in accordance with this teaching.

Factory one handles core product releases planned for regular or fixed release, e.g., twice a year. This factory uses an up front planning process, e.g., based on client, prospect, and market needs. One or more planners for factory one, such as a product planner, marketing person, or the like, select and prioritize content to be included in the product releases. The factory one content includes both mandatory and opportunity or nonmandatory items. The mandatory items are scheduled for inclusion in the factory one product. Nonmandatory items are not initially scheduled for inclusion in the factory one product, but can become mandatory items if time becomes available, for example, when factory one is over achieving the mandatory list or an occasional lull occurs in the factory two production schedule. Work in factory one typically consists of changes, enhancements, or new modules for existing products or new products for planned release.

Factory two handles custom solutions or other specialized work that varies on an ad hoc basis. These projects typically arise overnight and delivery is often needed within a short amount of time.

Figure 1:
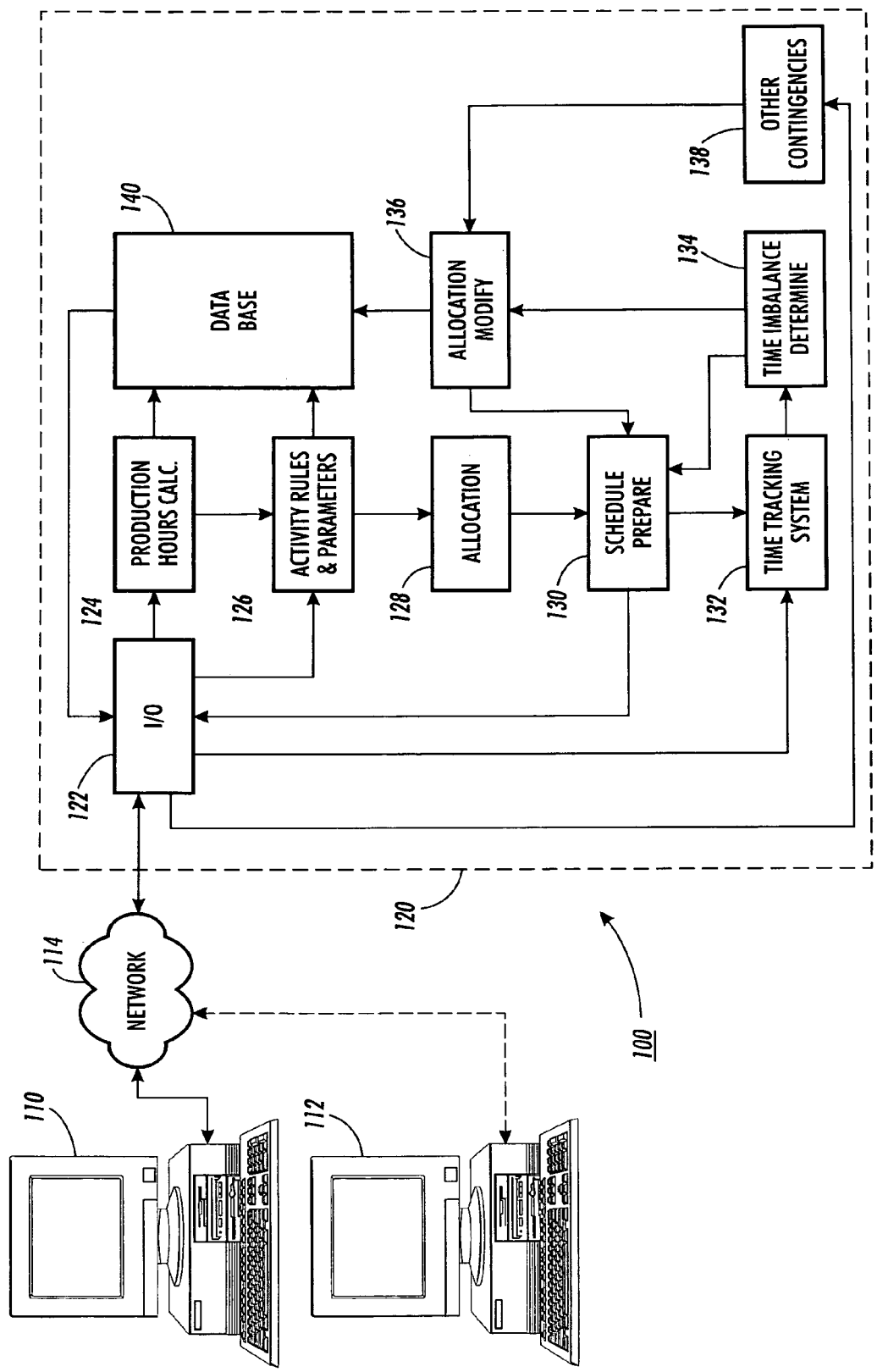
FIG. 1 is a block diagram of the project planning and management system 100 according to the present invention.
Figure 4:
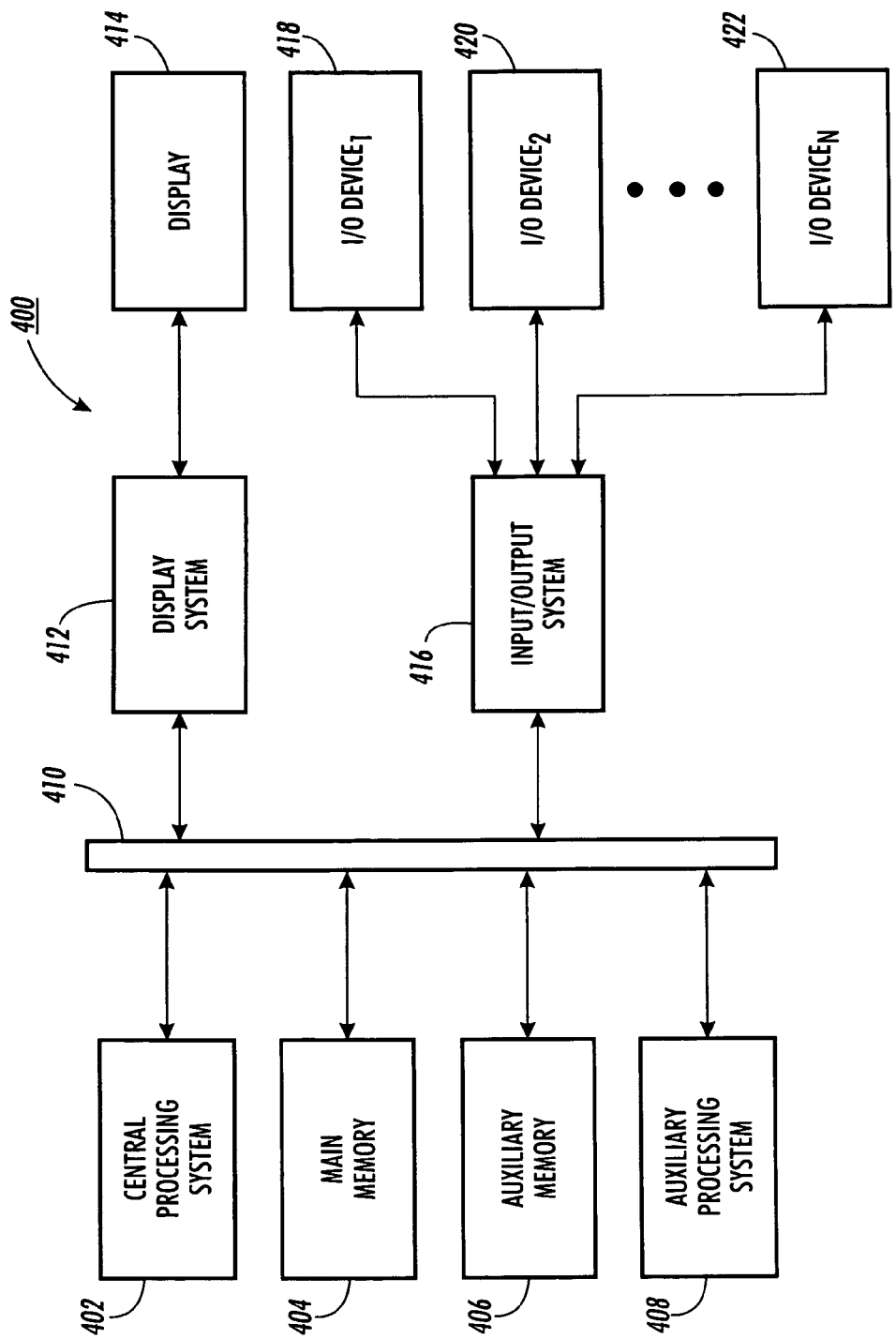
FIG. 4 illustrates a computer information handling system operable to embody the present invention.

FIG. 1 shows a block diagram of a project planning and management system 100 according to the present invention. In the depicted embodiment, the planning system 100 comprises one or more data terminals or workstations 110 up to N data terminals or workstations 112 interconnected with a project management system 120 via a network 114. Network 114 may be, for example, a local area network (LAN), metropolitan area network (MAN), wide area network (WAN), and the like, and interconnections thereof. Each of the workstations 110–112 may be a stand alone computer information handling system, such as a personal computer, minicomputer, mainframe computer, and the like, capable of operating independently of the network system 114. Likewise, the project management system 120 can be implemented as modules, e.g., software, firmware, or hardware modules, or any combination thereof, in a computer-based information handling system of a type as described above in reference to workstations 110–112. A hardware system 400 generally representative of exemplary hardware architecture of workstations 110–112 and an information handling system operable to implement the project management system 120 is illustrated in FIG. 4. Optionally, workstations 110–112 and network 120 are omitted and project management system 120 is implemented in a standalone information handling system as described above, for example, hardware system 400 (FIG. 4).

Workstations 110–112 are manipulated by one or more users, e.g., a planner, manager such as a department manager or project manager, etc., to enter necessary project information into the project management system 120. The information includes, for example, the available supply of work hours, activity allocation rules or guidelines on how time is to be allocated between different project types and to be spent on various steps or tasks associated with each project.

The project management system 120 includes an I/O section 122 which transmits and receives data to and from the workstations 110–112. A resource calculator 124 calculates an expected or estimated supply of available working hours based on information entered via the I/O section 122. The project management system 120 also includes an activity rules and parameters section 126 for storage of various time usage rules and parameters input via the I/O section 122.

A time allocation section 128 determines the amount of resources determined to be available by the resource supply calculator 124 that is to be allocated to each specific project type and, within each project type, to each project based on the rules and parameters section 126. Preferably, exceptions to the rules and parameters of section 128 or other adjustments for particular projects or specific tasks associated with a particular project can be made via I/O section 122. Activity rules and parameters section also includes allocation rules for allocating time between factory one, factory two, and reserve time.

In a preferred embodiment, each project is broken down into identifiable tasks required for project performance and completion, and each task is associated with an expected or estimated time for completion within the activity rules module 126. The sum of the individual tasks for a given project can then be used as the total time estimated for performing the project.

Based on the available production hour supply, selected projects, and the activity allocation rules, an allocation is made within allocation module 128 to factory one, factory two, and reserve time. Based on the allotted time, a schedule prepare section 130 prepares a task based schedule. The prepared schedule is output via I/O section 122. The schedule preferably shows the tasks selected for performance and the allocated time for each tasks. The tasks are preferably grouped according to department, project, etc.

A time tracking system 132 tracks the actual time spent on each project and the current status of each project. Actual time and status information is input via I/O section 122 by users of the system, such as persons performing the project or persons otherwise responsible for performance of the project. This information is input on periodic basis, e.g., daily, weekly, biweekly, monthly, etc., depending on, for example, the size of the projects, the time frame requirements of the projects, and acceptable tolerances in such time frames. The status of the project can be determined in a number of ways, such as inputting workers' or managers' estimates of additional time required to complete the project or reach some milestone, inputting milestones which have been reached, and so forth. In the above described preferred embodiment, wherein each project is broken down into identifiable tasks having an estimated or expected time for completion, status is determined based on the completed and uncompleted tasks and the associated allocation rules or estimates.

A time imbalance determine section 134 uses the input actual time and status data to reestimate the time required for completion of the projects and to determine how much of the allocated time remains. By comparing the reestimate with the remaining allocated time, it is determined whether a time imbalance exists. Preferably, time is allocated on a task by task basis and the remaining allocated time is determined by totaling the time allocated for yet uncompleted tasks.

A time imbalance can be determined to exist via a number of methods. A time imbalance is said to exist for a project type (e.g., all factory one projects or all factory two projects) when the reestimated time required for completion of all projects of a given type differs (or differs by more than a preselected amount) from the remaining allocated time for that project type. Likewise, a time imbalance for a project is said to exist if the reestimated time required for completion of a given project differs (or differs by more than a preselected amount) from the remaining allocated time for that project. Other methods for determining whether there is a time imbalance are also possible. For example, all activities, tasks, or projects within a given department can be grouped together, with a time imbalance being said to exist if the reestimated time required for completion of all projects of a given type differs (or differs by more than a preselected amount) from the remaining allocated time for that project type. In the event that there is no time imbalance, the schedule is not modified, although schedule prepare section 130 can output a schedule with updated status information via I/O section 122.

Upon the detection of a time imbalance by time imbalance calculator 134, an allocation modification section 136 modifies the time allocations to bring the reestimated time and the reallocated time into balance.

In one embodiment, time is reallocated on a project by project basis. For example, if a positive time imbalance is determined to exist for one or more particular projects, i.e., the reestimated time required for project completion is less that the allocated time remaining (i.e., the project was initially overallocated time), the plan is modified by allocation modification section 136 so that extra time is reallocated to one or more projects for which there is a negative time imbalance, i.e., the reestimated time required for project completion is more than the allocated time remaining (i.e., the project was initially underallocated time). If there are no positive time imbalances or if the positive time imbalances are insufficient to completely offset the negative time imbalances, reserve time is reallocated as necessary so as to offset the negative time imbalance. Likewise, if there are no negative time imbalances or if the total positive time imbalances are sufficient to offset the negative time imbalances, any excess time can be reallocated to the pool of reserve time. Alternatively, or in addition to reallocating time to the reserve pool, other reallocations of net positive time imbalances may also be made. For example, since allowing the pool of reserve time to become too large might result in a less than optimal use of the work hour resource, a positive time imbalance can be reallocated to factory one projects. By reallocating time to factory one projects, nonmandatory projects can be re-identified as mandatory projects to be included in the core product release, thus adding features or additional value to the core product release. Additionally, or alternatively, reallocating time to mandatory projects allows the product release date to be advanced. Increasing the quality and/or advancing the release date of the factory one product serves to increase overall customer satisfaction. Likewise, additional time resulting from positive time imbalances can be reallocated for performance of factory two ad hoc projects. In this manner, additional profitable custom projects can be accepted and incorporated into the work schedule. Additionally, or alternatively, existing factory two projects can be completed early.

In another embodiment, time is reallocated on a department by department basis. For example, if a positive time imbalance is determined to exist for all projects within a particular department, i.e., the department was initially overallocated time, the plan is modified by allocation modification section 136 so that extra time is reallocated to one or more other departments for which there is a negative time imbalance, i.e., the department was initially underallocated time. If there are no positive time imbalances or if the departmental positive time imbalances are insufficient to completely offset the negative departmental time imbalances, reserve time is reallocated as necessary so as to offset the negative time imbalance. Likewise, if there are no negative time imbalances or if the total departmental positive time imbalances are sufficient to offset the negative time imbalances, any excess time can be reallocated to the pool of reserve time. In this manner, a planner or department manager can effectively reallocate time among projects within a department before any reallocations between departments or project types are made.

In another embodiment, time is reallocated based on project type. For example, if a positive time imbalance is determined to exist for all projects of a particular type, e.g., mandatory or ad hoc, the plan is modified by plan modification section 136 so that extra time for one project type is reallocated to another project type for which there is a negative time imbalance. If there are no positive time imbalances or if the project-type positive time imbalances are insufficient to completely offset the negative departmental time imbalances, reserve time is reallocated as necessary so as to offset the negative time imbalance. Likewise, if there are no negative time imbalances or if the total project type positive time imbalances are sufficient to offset the negative time imbalances, any excess time can be reallocated to the pool of reserve time. In this manner, a planner or department manager can effectively reallocate time among all projects of a given type before any reallocations between project types are made.

Preferably, project management system 120 further includes an other contingencies section 138 for the input of exceptions to the activity rules, for example, due to estimation error, newly discovered defects in the product design or production process, and so forth.

Project management system 120 also includes a database 140 or other storage medium for storage of input values, schedules, allocations and modifications, etc. Data stored in database 140 is output via I/O section 122 in selectable formats for analysis. Advantageously, the data stored for prior production cycles can be stored and used to improve or refine the activity rules for future projects. Database 140 can be located at any convenient location on the network.

Figure 2:
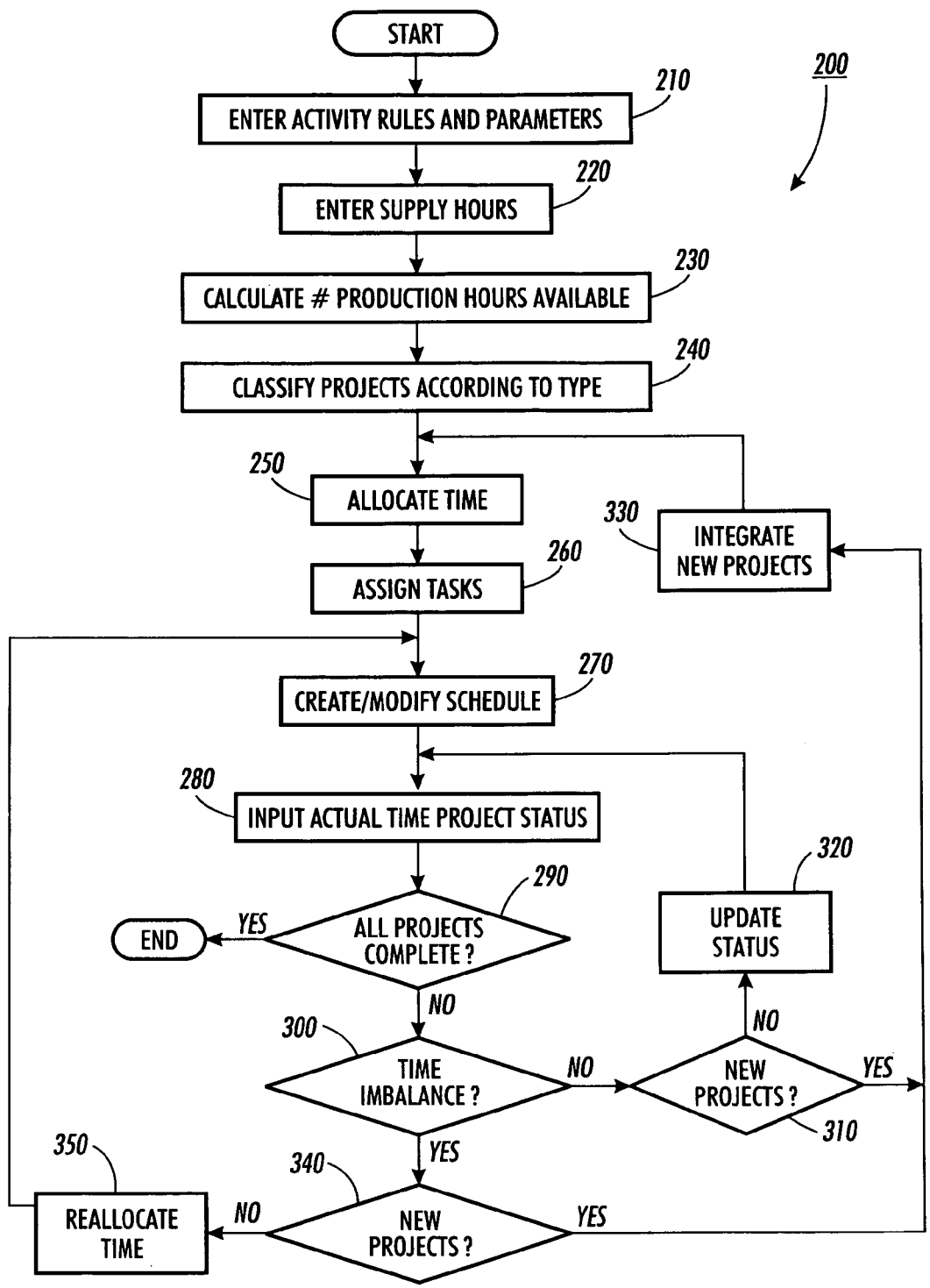
FIG. 2 is a flow chart outlining an exemplary method of the present invention.

Referring now to FIG. 2, there is shown a flow chart outlining a project planning and management method 200 of the present invention. In step 210, activity rules and parameters for production and nonproduction activities are input. In step 220, supply hour data are input by a user, such as a planner, manager, or the like, using a terminal 110–112. The data can be input, for example, using an on-screen worksheet, or an on-screen questionnaire, a series of interactive prompts, and the like. Working hours available for production are calculated by subtracting the hours required from nonproduction activities, such as vacation, training, etc., from the total supply of hours. Nonproduction hours can be estimated using stored or input activity rules based on standard or average values for each nonproduction activity, or can be based on previous experience, for example, based on values stored in database 138 from previous production cycles. The number of hours available for production are calculated in step 230 by subtracting the nonproduction hours from the supply hours.

Factory one and factory two project data are input in step 240 and the production hours are allocated between factory one, factory two, and reserve time in step 250. The initial allotment is based on the activity rules and preferably falls within a predetermined range. According to an exemplary, nonlimiting embodiment, 40–75% of production hours is allotted to factory one content, 15–30% for factory two content, and 15–25% are held in reserve. In a preferred embodiment, the time is also allocated based on the activity rules for each identifiable task or subproject making up the projects selected for performance. Alternatively, allocation may be made on a departmental basis, with further allocations within each department being at the discretion of a user, such as a department manager or the like.

In step 260, specific tasks required for performance of the selected projects are assigned to workers. A work schedule is created in step 270. In step 280, the status and actual time spent on each task is input. In step 290, if all projects are complete, the process ends. If all projects are not complete (step 290), it is determined whether a time imbalance exists at step 300.

If a time imbalance does not exist at step 300, it is determined at step 310 whether there any new projects to be added. If no new projects have been added (step 310), the status is updated at step 320 and the process returns to step 280. If new projects have been added at step 310 the process proceeds to 330. The new projects are integrated and the process returns to 250 for allocation, assignment, etc. New projects for integration include recent (ad hoc) requests for a new factory two product, nonmandatory factory one projects that have been reclassified as mandatory items, projects required for correction of newly discovered defects in a current product or project, and so forth.

If a time imbalance does exist at step 300, the process proceeds to step 340 and it is determined whether there are any new projects to be added. If no new projects have been added (step 340), the time is reallocated in step 350 and the process returns to step 270. If there are new projects, the process proceeds to step 330 wherein new products are integrated into the production schedule. The process then returns to step 250 and the production hours are reallocated to incorporate the new projects and to eliminate the time imbalance detected in step 300 and continues as described above.

Figure 3:
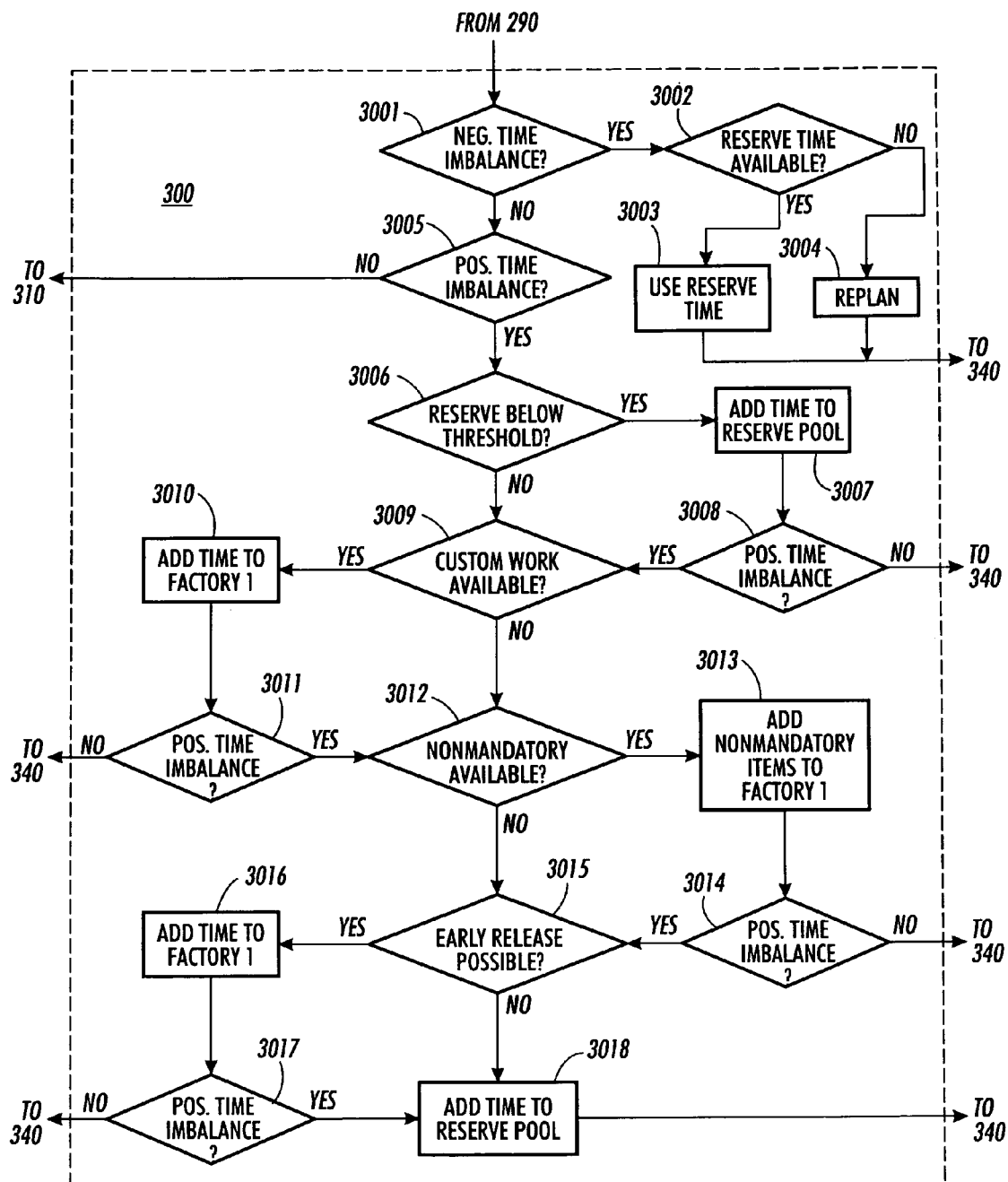
FIG. 3 is a flow chart illustrating an exemplary method of reallocating time in implementing the present invention.

Referring now to FIG. 3, step 300 of FIG. 2 is shown in greater detail in accordance with an exemplary embodiment. In step 3001, it is determined whether there is a negative time imbalance. If there is a negative time imbalance at step 3001, the process proceeds to step 3002 and it is determined whether reserve time is available. If reserve time is available, it is assigned for reallocation at step 3003 to balance the time, and the process proceeds to step 340. If there is no reserve time available at step 3002, the process proceeds to step 3004 and reallocation can be performed by redistributing remaining time as necessary to minimize the effect of the negative time imbalance. Also, a warning can be output at step 3004 and, if the negative time imbalance is significant, a replan may be necessary.

If there is no negative time imbalance in step 3001, it is determined in step 3005 whether there is a positive time imbalance. If there is no positive time imbalance at step 3005, the process continues to step 310.

If there is a positive time imbalance at step 3005, it is determined in step 3006 whether the reserve time has fallen below some threshold value, e.g., due to previous time reallocations, newly integrated projects, etc. If the reserve time has fallen below some threshold value, the positive time imbalance, or some portion thereof, is added at step 3007 to bring the reserve time up to the threshold level. The threshold level is some preselected value above which maintained reserve time is regarded as an inefficient allocation of working hours. The process then proceeds to step 3008 and it is determined if there is still a positive time imbalance. If no, the process continues to step 340.

If there is still a positive time imbalance at step 3008, or if the reserve time was above the threshold level (step 3006), the process continues to step 3009. At step 3009, it is determined whether there are any custom project requests that can be integrated into the current plan. If yes, the positive time imbalance, or some portion thereof, is assigned for reallocation to factory two for accommodation of the additional custom work in step 3010. The process continues to step 3011 and it is determined if there is still a positive time imbalance. If no, the process continues to step 340.

If there is still a positive time imbalance at step 3011, or if there was no custom work available (step 3009), the process continues to step 3012. At step 3012, it is determined whether there are any nonmandatory (opportunity) projects that can be integrated into the current plan. If yes, the positive time imbalance, or some portion thereof, is assigned in step 3013 for reallocation to factory one for accommodation of nonmandatory projects. The process continues to step 3014 and it is determined if there is still a positive time imbalance. If no, the process continues to step 340.

If there is still a positive time imbalance at step 3014, or if there was no opportunity work that could be accommodated at the time (step 3012), the process continues to step 3015. At step 3015, it is determined whether early release of the factory one product is possible. If yes, the positive time imbalance, or some portion thereof, is assigned in step 3016 for reallocation to factory one to allow for early release of the factory one product. The process continues to step 3017 and it is determined if there is still a positive time imbalance. If no, the process continues to step 340.

If there is still a positive time imbalance at step 3017, or if early release would not be possible or feasible even with the additional time (step 3015), the process continues to step 3018 and the additional time is added to the reserve pool. The process continues to step 340.

Referring now to FIG. 4, an information handling system operable to embody the present invention is shown. The hardware system 400 shown in FIG. 4 is generally representative of the hardware architecture of a computer-based information handling system of the present invention, such as data terminals 110–112, and an information handling system embodying project planning and management system 120. The hardware system 400 is controlled by a central processing system 402. The central processing system 402 includes a central processing unit such as a microprocessor or microcontroller for executing programs, performing data manipulations and controlling the tasks of the hardware system 400. Communication with the central processor 402 is implemented through a system bus 410 for transferring information among the components of the hardware system 400. The bus 410 may include a data channel for facilitating information transfer between storage and other peripheral components of the hardware system. The bus 410 further provides the set of signals required for communication with the central processing system 402 including a data bus, address bus, and control bus. The bus 410 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 400 include main memory 404, and auxiliary memory 406. The hardware system 400 may further include an auxiliary processing system 408 as required. The main memory 404 provides storage of instructions and data for programs executing on the central processing system 402. The main memory 404 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 406 provides storage of instructions and data that are loaded into the main memory 404 before execution. The auxiliary memory 406 may include semiconductor based memory such as read-only memory (ROM), programmable read-only memory (PROM), erasable programmable read-only memory (EPROM), electrically erasable programmable read-only memory (EEPROM), or flash memory (block oriented memory similar to EEPROM). The auxiliary memory 406 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 400 may optionally include an auxiliary processing system 408 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 400 further includes a display system 412 for connecting to a display device 414, and an input/output (I/O) system 416 for connecting to one or more I/O devices 418, 420, up to N number of I/O devices 422. The display system 412 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 414 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 416 may comprise one or more controllers or adapters for providing interface functions between the one or more I/O devices 418–422. For example, the input/output system 416 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 416 and I/O devices 418–422 may provide or receive analog or digital signals for communication between the hardware system 400 of the present invention and external devices, networks, or information sources. The input/output system 416 and I/O devices 418–422 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 400 of FIG. 4 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 404 of one or more computer systems configured generally as described in FIG. 4. Until required by the computer system, the set of instructions may be stored in another computer readable memory such as the auxiliary memory of FIG. 4, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, or optically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method for managing the planning and performance of multiple software projects, the multiple software projects comprising one or more projects that are identified as a mandatory type, one or more projects that are identified as nonmandatory type, and one or more projects of an ad hoc type that arise intermittently and are subject to change, the method comprising:

using a processing system for managing the planning and performance of multiple software projects, the processing system performing the following steps:

calculating a number of working hours available for performance of the multiple software projects;

estimating the time required for completion of each project;

based on said time estimates, allocating a first amount of time for performance of said mandatory projects, allocating a second amount of time for performance of said ad hoc projects, and allocating a third amount of time to be held in reserve, wherein the sum of the first, second, and third amounts of time is less than or equal to said available hours, and the third amount of time is less than a preselected threshold value;

assigning tasks associated with the projects for performance;

periodically inputting an actual time spent in performing the projects and a current status of each project;

based on the actual time spent and current status for each project, re-estimating the time required for completing each project;

for each mandatory type project, determining if there exists a negative or positive time imbalance between the allocated time for completion and the re-estimated time for completion;

if there exists a negative time imbalance, reallocating time held in reserve to one or more mandatory type projects to eliminate the time imbalance;

if there exists a positive time imbalance, performing one or more of the following operations to eliminate the positive time imbalance:

re-identifying one or more nonmandatory projects as mandatory;

reallocating time from one or more mandatory type projects to time held in reserve;

reallocating time from one or more mandatory type projects to one or more ad hoc projects; and reallocating time from one or more mandatory type projects to establish an earlier estimated completion date for one or more projects;

for each ad hoc type project, determining if there exists a negative or positive time imbalance between the allocated time for completion and the re-estimated time for completion;

if there exists a negative time imbalance, reallocating time held in reserve to one or more ad hoc projects to eliminate the time imbalance;

if there exists a positive time imbalance, performing one or more of the following operations to eliminate the positive time imbalance:

reallocating time from one or more ad hoc projects to one time held in reserve;

reallocating time from one or more ad hoc projects to one or more mandatory type projects;

reallocating time from one or more ad hoc projects to one or more nonmandatory projects and re-identifying the one or more nonmandatory projects as mandatory; and reallocating the time from one or more ad hoc projects to establish an earlier estimated completion date for one or more projects.

2. The method of claim 1, wherein each project comprises one or more identified tasks, the estimating step including estimating the time required for completion of each of said identified tasks and storing the estimates for each task in a database.

3. The method of claim 1, wherein the estimating step is based on previously performed tasks of a similar nature.

4. The method of claim 1, further including logging positive and negative time imbalances for future estimates.

5. The method of claim 1, wherein the assigning step includes assigning to a worker tasks associated with mandatory projects and tasks associated with ad hoc projects.

6. The method of claim 1, wherein the calculating step includes determining a total supply of work hours and subtracting an estimated number of hours for nonproduction activities.

7. An information handling system, comprising:

a processing system; and a software project planning and management system interconnected with said processing system, the software project planning and management system for managing the planning and performance of multiple software projects, the multiple projects comprising one or more projects that are identified as a mandatory type, one or more projects that are identified as nonmandatory type, and one or more projects of an ad hoc type that arise intermittently and are subject to change, the project planning and management system configured to:
  calculate a number of working hours available for performance of the multiple projects;
  estimate the time required for completion of each project;
  based on said time estimates, allocate a first amount of time for performance of said mandatory projects, a second amount of time for performance of said ad hoc projects, and a third amount of time to be held in reserve, wherein the sum of the first, second, and third amounts of time is less than or equal to said available hours;
  record assignments of tasks associated with the projects for performance;
  periodically receive input of an actual time spent in performing the projects and a current status of each project;
  reestimate, based on the actual time spent and current status for each project, the time required for completing each project;
  determine, for each mandatory type project, determining if there exists a negative or positive time imbalance between the allocated time for completion and the re-estimated time for completion;
  if there exists a negative time imbalance, reallocating time held in reserve to one or more mandatory type projects to eliminate the time imbalance;
  if there exists a positive time imbalance, performing one or more of the following operations to eliminate the positive time imbalance;
  re-identifying one or more nonmandatory projects as mandatory;
  reallocating time from one or more mandatory type projects to time held in reserve;
  reallocating time from one or more mandatory type projects to one or more ad hoc projects; and
  reallocating time from one or more mandatory type projects to establish an earlier estimated completion date for one or more projects;
  for each ad hoc type project, determining if there exists a negative or positive time imbalance between the allocated time for completion and the re-estimated time for completion;
  if there exists a negative time imbalance, reallocating time held in reserve to one or more ad hoc projects to eliminate the time imbalance;
  if there exists a positive time imbalance, performing one or more of the following operations to eliminate the positive time imbalance:
    reallocating time from one or more ad hoc projects to one time held in reserve;
    reallocating time from one or more ad hoc projects to one or more mandatory type projects;
    reallocating time from one or more ad hoc projects to one or more nonmandatory projects and re-identifying the one or more nonmandatory projects as mandatory; and
    reallocating the time from one or more ad hoc projects to establish an earlier estimated completion date for one or more projects.

8. The information handling system of claim 7, wherein each project comprises one or more identified tasks, and further wherein the project planning and management system is configured to estimate, for each project, the time required for completion of each of said identified tasks and to store the estimates in a database.

9. The information handling system of claim 7, wherein the project planning and management system is configured to estimate the time required for completion of each project based on previously performed tasks of a similar nature.

10. The information handling system of claim 7, wherein the project planning and management system is configured to log positive and negative time imbalances.

11. The information handling system of claim 7, wherein the project planning and management system is configured to record assignments of tasks associated with mandatory projects and tasks associated with ad hoc projects to a worker.

12. The information handling system of claim 7, wherein the project planning and management system is configured to calculate the number of working hours available by determining a total supply of work hours and subtracting an estimated number of hours for nonproduction activities.

13. A planning system for the planning and management of multiple projects, the multiple projects comprising one or more projects that are identified as a mandatory type, one or more projects that are identified as nonmandatory type, and one or more projects of an ad hoc type that arise intermittently and are subject to change, the system comprising:
  an input means for entering project information and task information associated with each project, the project information identifying each project as being of a mandatory, nonmandatory, or ad hoc type, and the task information describing each task to be performed by users of the system and an estimated duration of each task;
  a work hour calculator for calculating a number of working hours available for performance of the multiple projects;
  an allocation engine for allocating a first amount of time for performance of said mandatory projects, a second amount of time for performance of said ad hoc projects, and a third amount of time to be held in reserve, wherein the sum of the first, second, and third amounts of time is less than or equal to said available hours;
  a schedule preparation engine for preparing a schedule of tasks for performance, the schedule comprising an estimated time for the performance of each task;
  a time tracking system for recording actual time spent in performing the projects and a current status of each project;
  a time imbalance calculator for detecting a difference between actual time spent in performance of the projects and the estimated time for performance of the projects; and
  an allocation modification engine for reestimating the time required for completing each project based on the actual time spent and current status for each project and for each mandatory type project, determining if there exists a negative or positive time imbalance between the allocated time for completion and the re-estimated time for completion;
  if there exists a negative time imbalance, reallocating time held in reserve to one or more mandatory type projects to eliminate the time imbalance;

if there exists a positive time imbalance, performing one or more of the following operations to eliminate the positive time imbalance;
re-identifying one or more nonmandatory projects as mandatory;
reallocating time from one or more mandatory type projects to time held in reserve;
reallocating time from one or more mandatory type projects to one or more ad hoc projects; and
reallocating time from one or more mandatory type projects to establish an earlier estimated completion date for one or more projects;
for each ad hoc type project, determining if there exists a negative or positive time imbalance between the allocated time for completion and the re-estimated time for completion;
if there exists a negative time imbalance, reallocating time held in reserve to one or more ad hoc projects to eliminate the time imbalance;
if there exists a positive time imbalance, performing one or more of the following operations to eliminate the positive time imbalance:
reallocating time from one or more ad hoc projects to one time held in reserve;
reallocating time from one or more ad hoc projects to one or more mandatory type projects;
reallocating time from one or more ad hoc projects to one or more nonmandatory projects and re-identifying the one or more nonmandatory projects as mandatory; and
reallocating the time from one or more ad hoc projects to establish an earlier estimated completion date for one or more projects.

14. The planning system of claim 13, wherein the estimated time required for completion of each task is based on previously performed tasks of a similar nature.

15. The planning system of claim 13, wherein the schedule preparation engine schedules tasks associated with mandatory projects and tasks associated with ad hoc projects to a worker.

16. The planning system of claim 13, wherein the work hour calculator calculates the number of working hours available by determining a total supply of work hours and subtracting an estimated number of hours for nonproduction activities.

* * * * *